US011982417B2

(12) United States Patent
Herlin et al.

(10) Patent No.: US 11,982,417 B2
(45) Date of Patent: *May 14, 2024

(54) AUTOMOTIVE LIGHTING AND/OR SIGNALING DEVICE

(71) Applicant: AUTOMOTIVE LIGHTING ITALIA S.p.A., Turin (IT)

(72) Inventors: Jean-Pascal Herlin, Turin (IT); Sara Paroni, Turin (IT); Pierfrancesco Zilio, Turin (IT)

(73) Assignee: AUTOMOTIVE LIGHTING ITALIA S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,166

(22) Filed: May 8, 2019

(65) Prior Publication Data
US 2019/0346106 A1     Nov. 14, 2019

(30) Foreign Application Priority Data

May 8, 2018    (EP) .................................... 18425032

(51) Int. Cl.
*F21S 41/24* (2018.01)
*F21S 41/141* (2018.01)
(Continued)

(52) U.S. Cl.
CPC ............. *F21S 41/24* (2018.01); *F21S 41/141* (2018.01); *F21S 43/14* (2018.01); *F21S 43/241* (2018.01); *F21S 43/245* (2018.01); *F21S 43/249* (2018.01)

(58) Field of Classification Search
CPC ...... F21S 41/141; F21S 41/24; G02B 6/0048; G02B 6/0051; G02B 6/0038; G02B 6/0021

See application file for complete search history.

(56) References Cited

U.S. PATENT DOCUMENTS 5,197,792 A * 3/1993 Jiao .................... G02B 6/0048
                                                    362/623
6,097,549 A * 8/2000 Jenkins ................. B60Q 1/302
                                                    359/726

(Continued)

FOREIGN PATENT DOCUMENTS

CN      101389898 A    3/2009
CN      102261621 A    11/2011
(Continued)

OTHER PUBLICATIONS

Communication dated Oct. 24, 2018 transmitting the Extended European Search Report for European Patent Application No. 18425032 dated Oct. 16, 2018.

(Continued)

*Primary Examiner* — Eric T Eide
(74) *Attorney, Agent, or Firm* — Howard & Howard Attorneys PLLC

(57) ABSTRACT

A lighting and/or signaling device, comprising a light guide, at least one LED light source, wherein an inlet and diffusion wall and the light outlet wall are opposite to each other along a main optical axis (X). The lighting portion comprises a middle lighting portion aligned with the LED light source and the light emission portion, and a peripheral lighting portion. The device comprises at least one reflector element associated with the light inlet and diffusion wall of the light guide and directly facing the respective extraction elements so as to reflect light towards the light outlet wall. A diffusion layer is arranged to cover the lighting portion on the side of the light outlet wall. Cylindrical optics are provided on the light outlet wall, at the middle lighting portion, which extract the incident light beams thereon, towards the diffusion layer.

17 Claims, 7 Drawing Sheets

(51) Int. Cl.
    *F21S 43/14*     (2018.01)
    *F21S 43/241*    (2018.01)
    *F21S 43/245*    (2018.01)
    *F21S 43/249*    (2018.01)

(56) References Cited

U.S. PATENT DOCUMENTS

| | | | |
|---|---|---|---|
| 2002/0007576 A1* | 1/2002 | Gai | G02B 6/0031 |
| | | | 40/546 |
| 2004/0070989 A1 | 4/2004 | Amano et al. | |
| 2004/0141323 A1 | 7/2004 | Aynie et al. | |
| 2009/0003002 A1 | 1/2009 | Sato | |
| 2009/0196071 A1 | 8/2009 | Matheson et al. | |
| 2010/0079980 A1 | 4/2010 | Sakai | |
| 2011/0292655 A1* | 12/2011 | Ing | G09F 13/14 |
| | | | 362/241 |
| 2012/0069575 A1 | 3/2012 | Koh et al. | |
| 2012/0102798 A1* | 5/2012 | Oki | G02B 6/0043 |
| | | | 40/541 |
| 2012/0313534 A1* | 12/2012 | Urtiga | F21V 7/0091 |
| | | | 315/158 |
| 2013/0235590 A1 | 9/2013 | Van Der Sijde et al. | |
| 2014/0133180 A1 | 5/2014 | Sakai | |
| 2015/0338048 A1 | 11/2015 | Ahn et al. | |
| 2019/0346612 A1 | 11/2019 | Herlin et al. | |

FOREIGN PATENT DOCUMENTS

| | | |
|---|---|---|
| CN | 102411166 A | 4/2012 |
| CN | 102483195 A | 5/2012 |
| CN | 103827575 A | 5/2014 |
| CN | 104995452 A | 10/2015 |
| EP | 1416220 A1 | 5/2004 |
| EP | 2696226 A1 | 2/2014 |
| FR | 2841967 A1 | 1/2004 |
| FR | 2911192 A1 | 7/2008 |
| JP | 2008-027886 A | 2/2008 |
| JP | 2010108919 A | 5/2010 |
| JP | 2014502022 A | 1/2014 |
| WO | 2007087710 A1 | 8/2007 |
| WO | 2008107584 A2 | 9/2008 |
| WO | 2008126023 A2 | 10/2008 |

OTHER PUBLICATIONS

First Office Action for Chinese Patent Application No. 201910378600.4 dated May 20, 2022.
Communication for European Patent Application No. 18425032 dated Oct. 28, 2021.
Office Action for Japanese Patent Application No. 2019-088327 mailed Mar. 28, 2023.
Second Office Action for Chinese Patent Application No. 201910378600.4 dated Apr. 17, 2023.

* cited by examiner

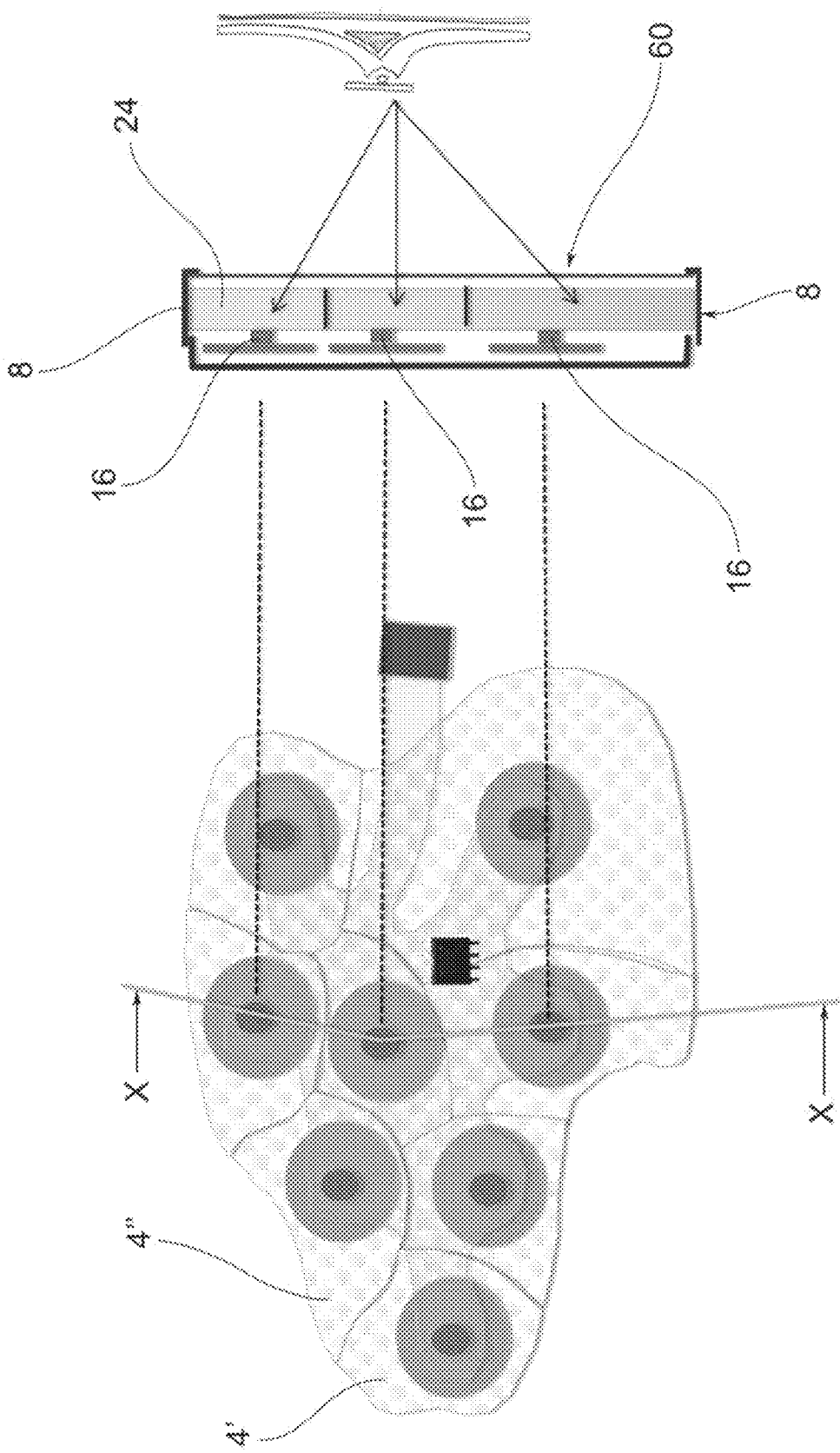

AUTOMOTIVE LIGHTING AND/OR SIGNALING DEVICE

CROSS-REFERENCE TO RELATED APPLICATIONS

The present application claims priority to and all the benefits of European Patent Application No. 18425032, filed on May 8, 2018, which is hereby expressly incorporated herein by reference in its entirety.

BACKGROUND OF THE INVENTION

1. Field of the Invention

The present invention relates to an automotive lighting and/or signaling device.

2. Description of the Related Art

The term automotive lighting and/or signaling device is used herein in a very broad sense in order to comprise both a rear and front automotive lamp, the latter also being called headlight or headlamp.

Therefore, a position light, a direction indicator light, a stop light, a rear fog light, a reversing light, a dipped-beam headlamp, a high-beam headlamp and the like, are included.

Moreover, the term is also meant to comprehend a map light, a light for an instrument panel or part thereof; thus, the automotive lighting and/or signaling device may be located both inside and outside the vehicle.

As known, said automotive lighting and/or signaling devices may be used both for lighting and for sending visual signals.

To these ends, said devices comprise a plurality of lighting portions having different colors, different levels of brightness, also according to regulations to be complied with and the like. Nevertheless, the automotive lamp increasingly is a distinctive element of the motor vehicle and accordingly, special attention is particularly paid to its appearance. In the case in point, the need is increasingly felt to make automotive lighting and/or signaling devices which ensure an increased homogeneity of the lighting portions in order to meet appearance-related in addition to functional needs.

To this end, there are solutions in the art with OLEDS which ensure an increased homogeneity of the lighting portions; however, such solutions are quite costly and in any case have limitations in terms of life cycle and diagnostics in the event of breakdown.

SUMMARY OF THE INVENTION

This latter limitation is not negligible since the need is increasingly felt in the art not only to use the automotive lamp as an instrument for meeting type-approval needs in order to obtain light beams which are to comply with specific photometric needs, but also as specific design instrument of the vehicle on which the lamp is applied.

Thus, not only does the lighting pattern emitted by the lamp serve the function of fulfilling the function of signaling and/or illuminating, but also the one of creating an accurate wanted light effect.

Moreover, the lighting and/or signaling device may also be used in order to send light signals such as text, graphic symbols, and also to make light animations created by accurate sequences of turning on light portions.

Therefore, the need is felt in the art to make available an affordable automotive lighting and/or signaling device which is more efficient than OLEDS and is capable of ensuring an increased lighting homogeneity comparable with the one which may be obtained with OLEDS, albeit without having the drawbacks of the OLED technology.

Such a need is met by an automotive lighting and/or signaling device comprising a light guide lit from the back by LED light sources and capable of providing a lighting surface without bright spots/dark areas. Other embodiments of the present invention are described in the present application.

BRIEF DESCRIPTION OF THE DRAWINGS

Further features and advantages of the present invention will become more comprehensible from the following description of preferred, non-limiting embodiments, in which:

FIG. 9 depicts a plan view of a lighting and/or signaling module according to a further embodiment of the present invention; and FIG. 10 depicts a sectional view of the module in FIG. 9, along the sectional plane X-X indicated in FIG. 9.

The elements or parts of elements common to the embodiments described later will be indicated using the same reference numerals.

DETAILED DESCRIPTION OF THE INVENTION

Figure 1:
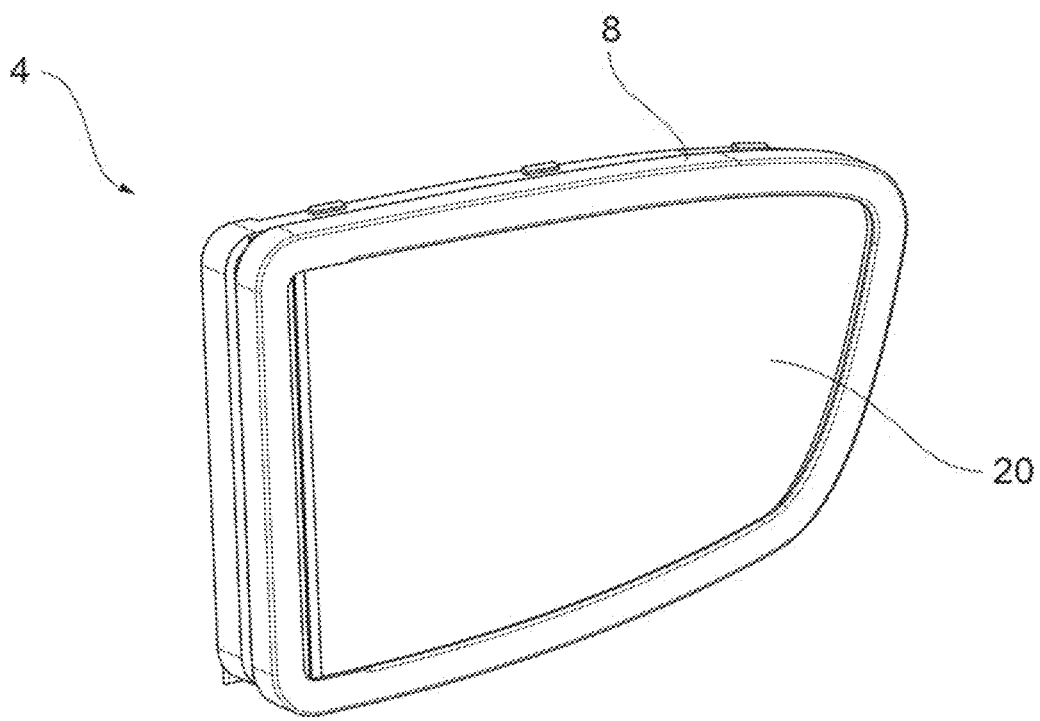
FIG. 1 depicts a perspective view, in assembled view, of a lighting and/or signaling device according to one embodiment of the present invention.
Figure 4:
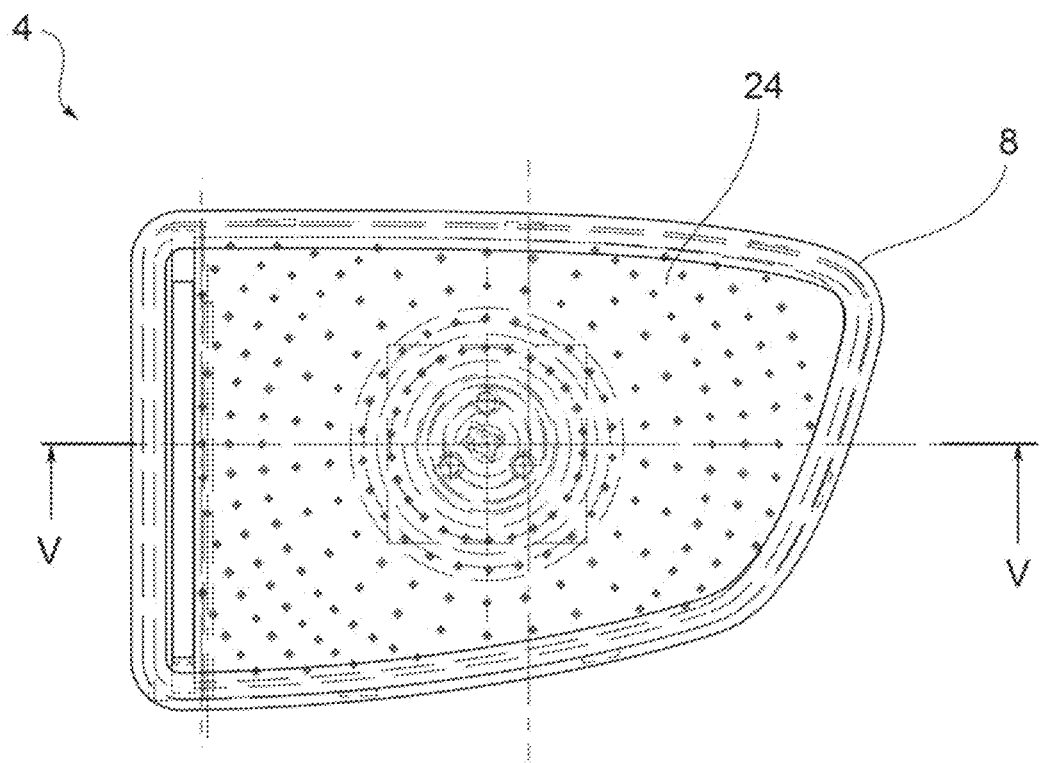
FIG. 4 depicts a front view, in assembled configuration, of the lighting and/or signaling device in FIG. 1.
Figure 2:
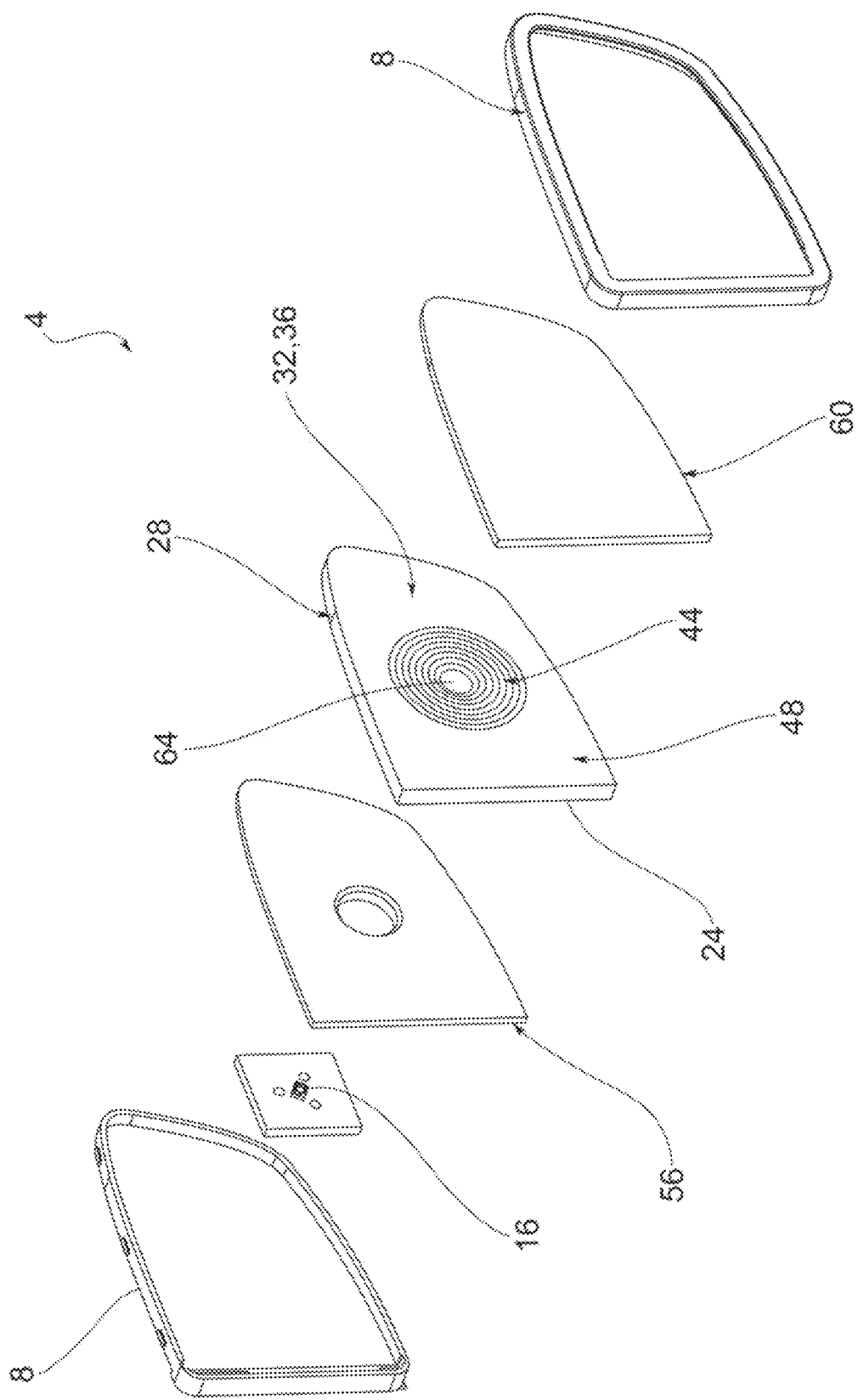
FIG. 2 depicts a perspective view, in separate parts, of the lighting and/or signaling device in FIG. 1.
Figure 3:
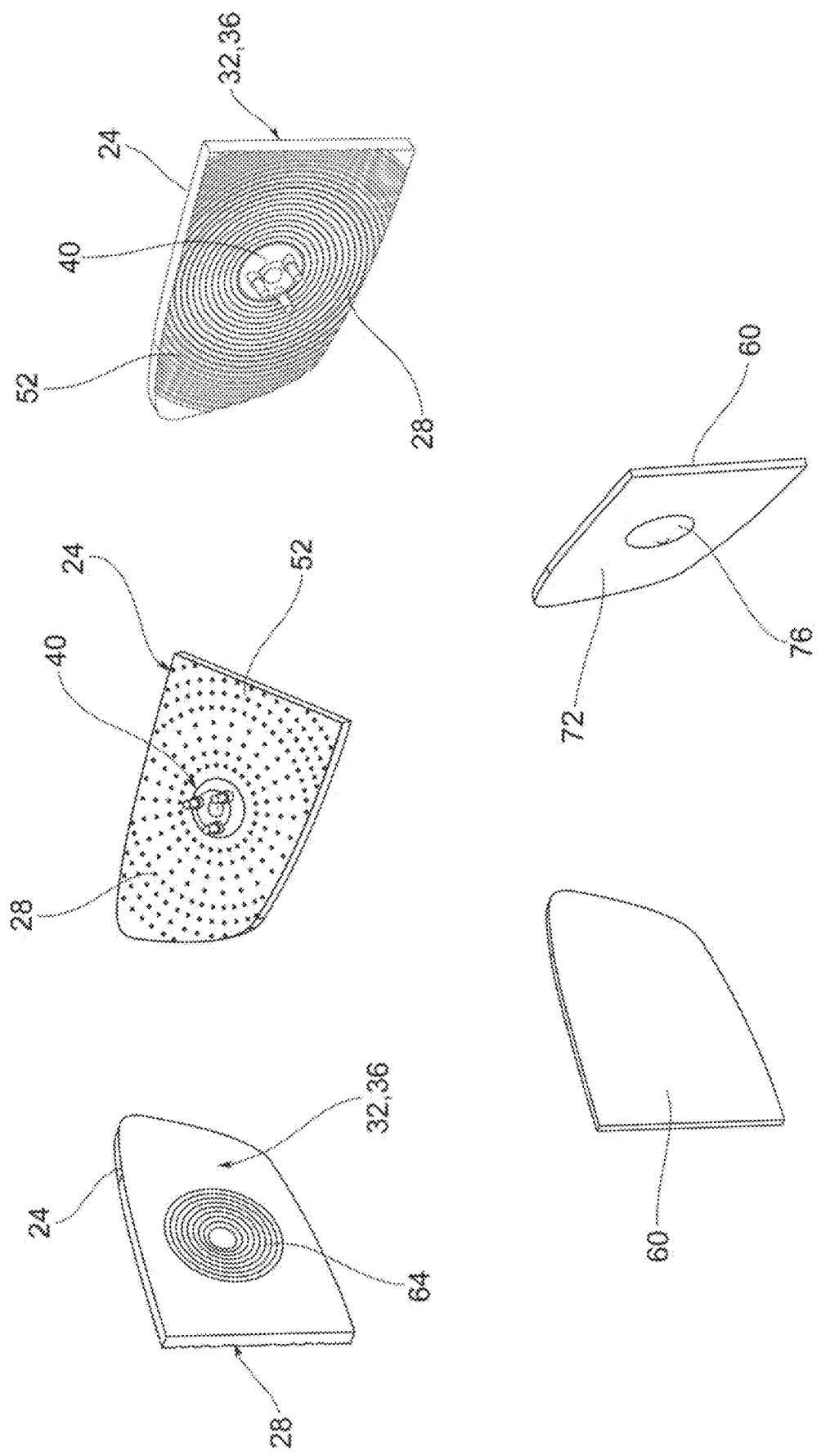
FIG. 3 depicts perspective views of certain components of the lighting and/or signaling device in FIG. 1.
Figure 5:
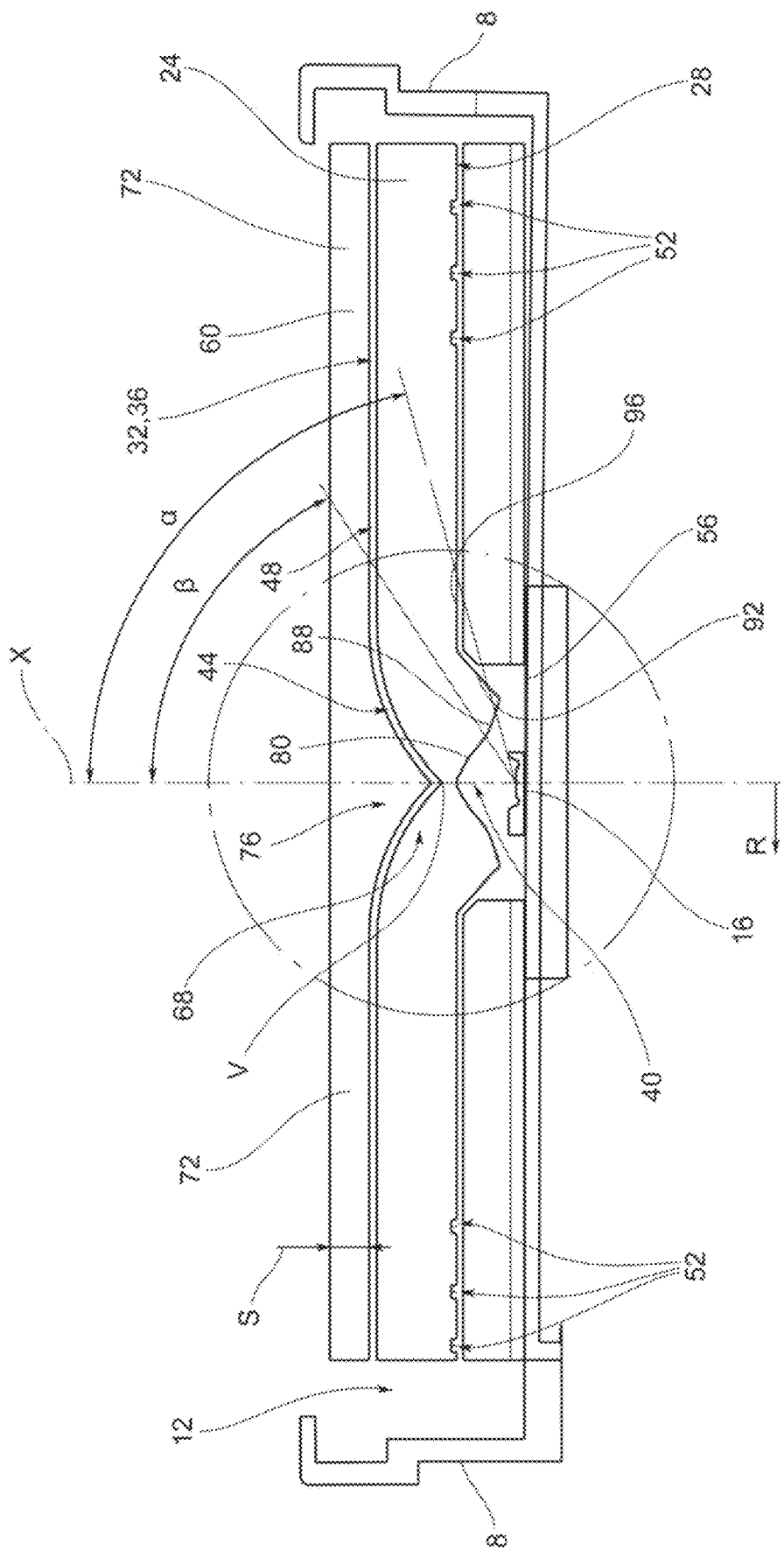
FIG. 5 depicts a sectional view of the lighting and/or signaling device in FIG. 1, along the sectional plane V-V indicated in FIG. 4.

With reference to the aforesaid drawings, 4 indicates a lighting and/or signaling device as a whole, such as an automotive lamp, to which the following disclosure refers without however being less general.

As mentioned above, the term lighting and/or signaling device may indifferently mean a rear automotive lamp or a front automotive lamp, the latter also called headlight or headlamp, comprising at least one external vehicle light serving a function of illuminating and/or signaling, such as for example a position light, which may be a front, rear, side position light of a direction indicator light, a stop light, a rear fog light, a high-beam headlamp, a dipped-beam headlamp and the like.

Moreover, the term lighting and/or signaling device may also be used to refer to a map light, a light for an instrument panel or part thereof, a display and so on.

Thus, as better described below, in the signaling function thereof, the device may comprise the possibility of sending light signals, logos, but also text and light messages of any kind.

The lighting and/or signaling device 4 comprises a container body or housing 8, usually made of polymeric material, which typically allows fastening the lighting and/or signaling device 4 to the related vehicle.

For the purposes of the present invention, the container body or housing 8 may have any shape and size, and also positioning. For example, the container body 8 might not be directly connected to the body or other fastenings of the vehicle.

As shown, the container body 8 may also be connected internally to the vehicle, for example on the dashboard, on the instrument panel, on the parcel shelf and so on.

The container body 8 delimits a containment seat 12 which accommodates a plurality of components of said lighting and/or signaling devices, and in particular LED light sources 16.

The LED light source 16 emits a light beam which is diffused along a main optical axis X-X.

In other words, the LED light source 16 emits a light beam comprising a plurality of light rays arranged about the main optical axis X-X, preferably in axisymmetric manner.

The container body 8 is connected to a lenticular body 20 so as to close said containment seat 12 which accommodates the at least one LED light source 16.

For the purposes of the present invention, the lenticular body 20 may be external to the lighting and/or signaling device 4 so as to define at least one outer wall of the lighting and/or signaling device directly subjected to the atmosphere.

The lenticular body 20 closes the containment seat 12 and is suitable for being crossed by the light beam generated by the LED light source 16 which is transmitted outside the containment seat 12.

To this end, the lenticular body 20 is made with at least partially transparent or semi-transparent or translucent material, it also being capable of including one or more opaque portions, in any case so as to allow the at least partial crossing of the light beam generated by the light source.

According to possible embodiments, the material of the lenticular body 20 is a resin such as PMMA, PC and the like.

A mask (not shown) for conveniently delimiting light emission portions of the lighting and/or signaling device 4 may also be applied to the lenticular body 20.

The lighting and/or signaling device 4 comprises a light guide 24 located in a housing chamber defined by the closed container body with the lenticular body. Such a light guide 24 extends from a light inlet and diffusion wall 28 adapted to receive a light beam to a light outlet wall 32 which creates a lighting portion 36 of device 4.

The inlet and diffusion wall 28 and the light outlet wall 32 are opposite to each other along the main optical axis X.

The LED light source 16 faces a light emission portion 40 (called incoupling in jargon) of the light inlet and diffusion wall 28. The light emitted by the LED source 16 may thus penetrate the light guide 24 through said light emission portion 40, to be transmitted by total internal reflection between the light inlet and diffusion wall 28 and the light outlet wall 32.

The lighting portion 36 comprises a middle lighting portion 44 aligned with the LED light source 16 and with the light emission portion 40, and a peripheral lighting portion 48 which surrounds said middle lighting portion 44. Preferably, the lighting portion 36 is axisymmetric with respect to the main optical axis X-X of the LED light source 16.

The light guide 24 is provided with extraction elements 52 arranged on the light inlet and diffusion wall 28—with the exception of the light emission portion 40—at said peripheral lighting portion 48.

According to one embodiment, the extraction elements 52 are micro optics which directly or indirectly diffuse the light towards the light outlet wall 32.

For example, said extraction elements 52 may comprise punctiform micro optics and/or concentric grooves.

Preferably, the extraction elements 52 are arranged according to a non-homogeneous pattern having a density which increases as the distance from the corresponding LED light source 16 increases along a radial direction R, contained in a plane perpendicular to the main optical axis X-X and incident with the latter.

Moreover, the lighting and/or signaling device 4 comprises at least one reflector element 56 associated with the light inlet and diffusion wall 28 of the light guide 24 and directly facing the respective extraction elements 52 so as to reflect light towards the light outlet wall 32. In greater detail, the extraction elements 52 may be structured to direct the light towards the reflector element 56 so that it may reflect the light towards the light outlet wall 32 in more homogeneous manner. Or, in one alternative embodiment, the extraction elements 52 may be structured to direct the light directly towards the light outlet wall 32, with the reflector element 56 prepared to recover light lost by the extraction elements 52 in the opposite direction.

Figure 6A:
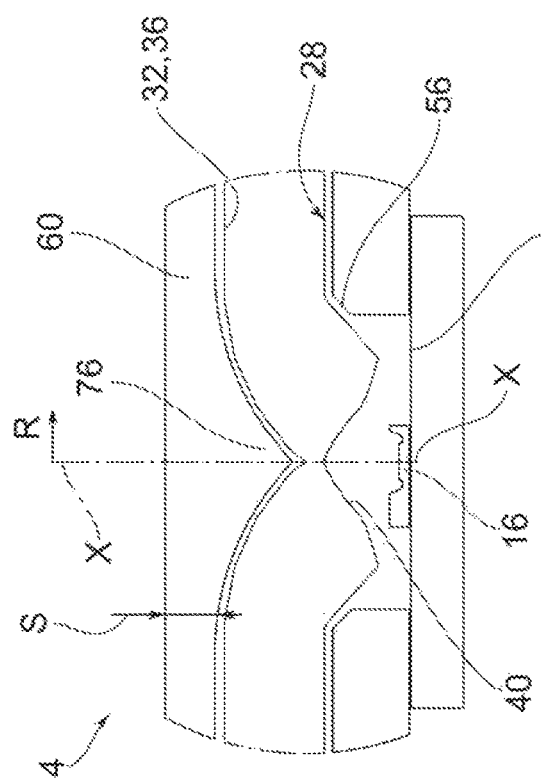
FIGS. 6A-6D depict sectional views of details of a lighting and/or signaling device according to different embodiments of the present invention.
Figure 6B:
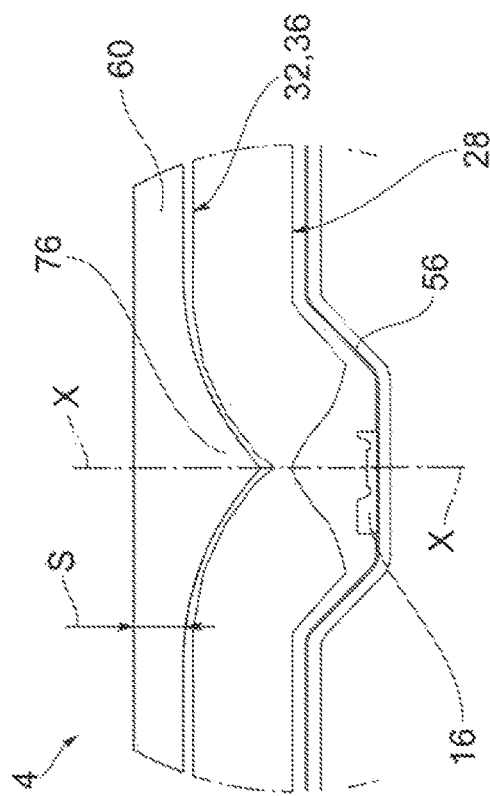
Figure 6C:
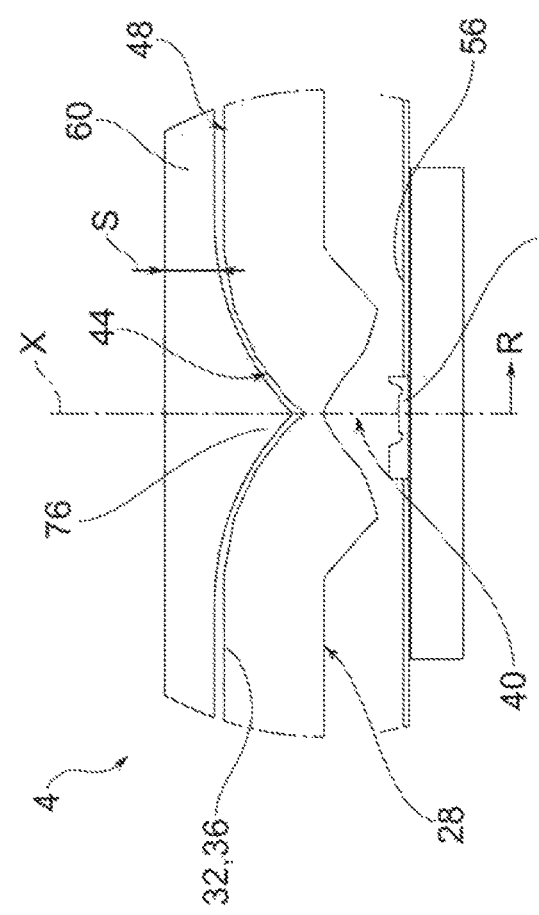
Figure 6D:
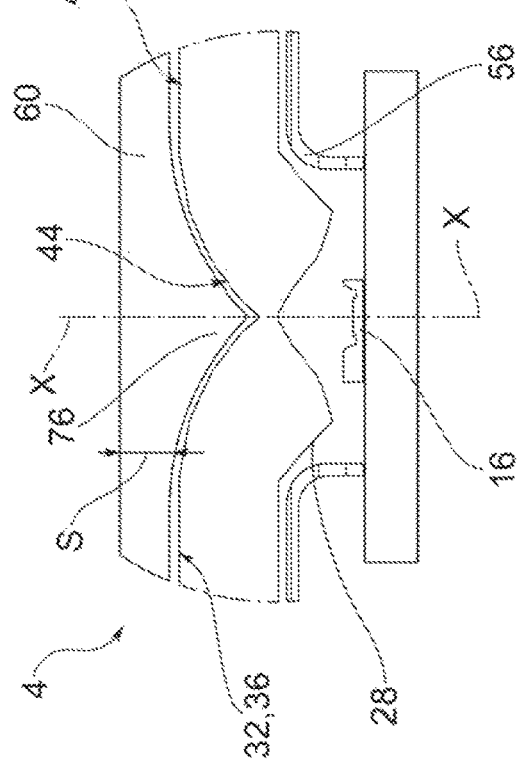
Figure 8:
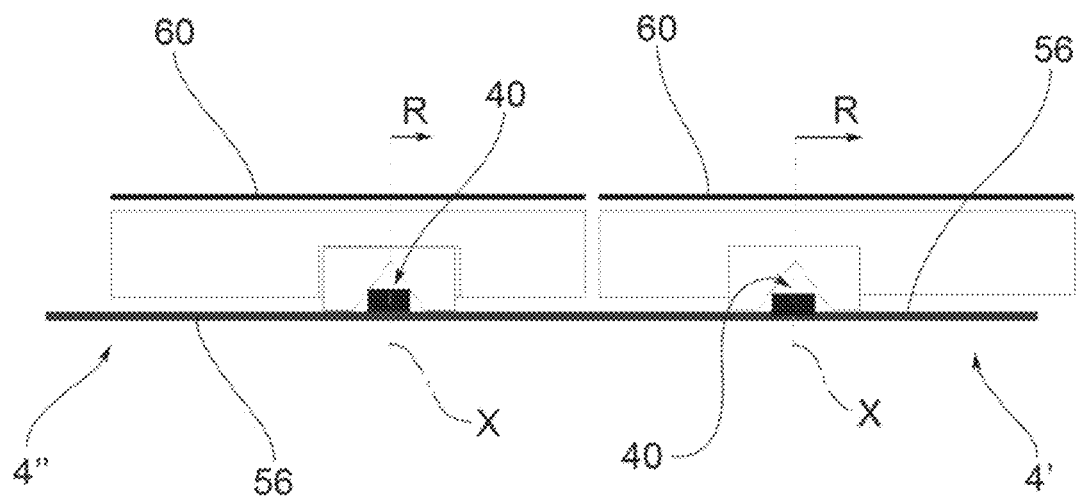
FIG. 8 depicts a sectional view of the module in FIG. 7.
Figure 7:
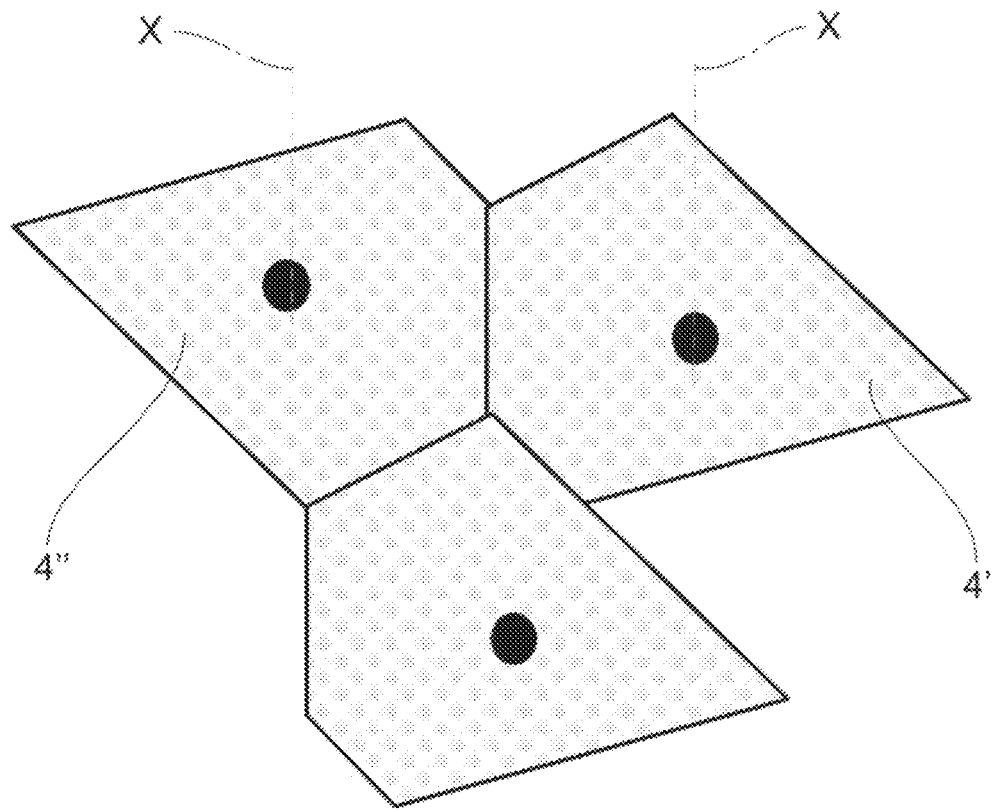
FIG. 7 depicts a plan view of a lighting and/or signaling module according to one embodiment of the present invention.

According to possible embodiments, the reflector element 56 is a white film (FIGS. 6A, 6C, 6D) or a mirror (FIG. 6B) reflecting the light from the light inlet and diffusion wall 28 of the light guide 24.

The reflector element 56 may be placed at a predetermined distance with respect to the light inlet and diffusion wall 28 so as to form a gap between the two elements. Such a contrivance could improve the mixing of the light reflected by the reflector element 56. However, such a gap could be reduced as must as possible, up to being eliminated, so as to reduce a thickness of the lighting and/or signaling device 4, i.e. a distance between the light inlet and outlet walls 28, 32.

Advantageously, a diffusion layer 60, or opaline or embossed layer, is arranged to cover the lighting portion 36 on the side of the light outlet wall 32, as is better described below.

Advantageously, said diffusion layer 60 has a differentiated transmission factor according to the light intensity of the incident light rays on the lighting portion 36 so as to obtain a uniform light intensity over the whole lighting portion 36 itself.

In other words, the light outlet wall 32 may include, for example, the diffusion layer 60, to selectively vary the transmission factor of the light beam along said light outlet wall 32 so as to balance, level, make uniform, homogenize the light intensity (brightness) of said middle (44) and peripheral (48) lighting portions of the light outlet wall 32.

In particular, according to one embodiment, the diffusion layer 60 has a smaller transmission factor at the incident light rays having greater light on the lighting portion and a greater transmission factor at the incident light rays having smaller light intensity on the lighting portion 36.

According to one embodiment, the diffusion layer 60 has a smaller transmission factor at the middle lighting portion 44 and a greater transmission factor at the peripheral lighting portion 48.

According to a possible embodiment, the diffusion layer 60 comprises an opaline layer and the transmission factor variation is obtained by varying the thickness S of the opaline layer with respect to a sectional plane parallel to the main optical axis X-X of the LED light source 16.

According to one variant, the transmission factor variation of the opaline layer may be obtained by varying the density and/or size of the scattering particles of the opaline material.

Preferably, thickness S of the opaline layer is greater at the middle lighting portion 44 and smaller at the peripheral lighting portion 48.

According to a further possible embodiment, the diffusion layer 60 comprises an embossed layer and the transmission factor variation is obtained by varying the embossing density/roughness and/or thickness S of the embossed layer with respect to a sectional plane parallel to the main optical axis X-X of the LED light source 16.

Preferably, thickness S of the embossed layer and/or the density of the embossing is greater at the middle lighting portion 44 and smaller at the peripheral lighting portion 48.

According to a further possible embodiment, the diffusion layer may comprise a silkscreen printed layer and the transmission factor variation may be obtained by use of different patterns.

According to a possible embodiment, there are provided, on the light outlet wall 32, at the LED light source 16, cylindrical optics 64 which extract the incident light rays thereon, towards the diffusion layer 60.

For example, said cylindrical optics 64 are cylindrical paths/grooves/reliefs which are concentric to one another with respect to the main optical axis X-X of the LED light source 16.

Preferably, said cylindrical optics 64 are arranged at the middle lighting portion 44 of the light outlet wall 32. The middle lighting portion 44 of the light outlet wall 32 provided with such cylindrical optics 64 therefore absolves the dual function of reflecting light inside the light guide 24, thus meeting the condition of total internal reflection, and at the same time of extracting light from the light guide 24 preferably, but not necessarily, along directions parallel to the main optical axis X-X of the LED light source.

According to an embodiment, said cylindrical optics 64 on the light outlet wall 32 are configured in relation to the extraction elements 52 on the light inlet and diffusion wall 28 so as to extract light rays of equal light intensity overall on the lighting portion 36, thus obtaining a homogenous lighting.

For the purposes of the present invention, the light emission portion 40 directly facing the LED light source 16 may take on specific geometries.

Preferably, the conveying portion has a concavity, for example a geometry with a spherical cap, which is concave towards the LED light source 16. The light guide 24 has, at the light emission portion 40, on the side of the light outlet wall 32, a conical portion 68, which is axisymmetric with respect to the main optical axis X-X of the LED light source 16, having a vertex V facing the light emission portion 40 and aligned with the LED light source 16.

Preferably, the diffusion layer 60 has a planar peripheral portion 72 and a conical middle projection 76, which is counter-shaped with respect to the conical portion 68 of the light guide 24.

According to a possible embodiment, with respect to a sectional plane parallel to the main optical axis X-X of the LED light source 16, the light emission portion 40 of the light inlet and diffusion wall 28 comprises:

a first lower stretch 80 shaped to deflect/refract light rays forming a first angle α which preferably is less than 50°, so that they may affect the conical portion 68 of the light outlet wall 32 and be reflected by the latter by total internal reflection along the portion of the light guide 24 delimited by the light inlet wall 28 and the light outlet wall 32, a second lower stretch 88, contiguous to the first lower stretch 80, that directs the light rays emitted at angles greater than the first angle α and less than a second angle β which is less than 81°, towards a portion of the light outlet wall 32 adjacent to the conical portion 68 so that they may be reflected by total internal reflection along a portion of the light guide 24 delimited by the light inlet wall 28 and the light outlet wall 32, a third lower stretch 92, contiguous to the second lower stretch 88, that does not reflect rays refracted from the second lower stretch 88.

According to an embodiment, the extraction elements 52 and the reflector element 56 are arranged from a fourth lower stretch 96 which is contiguous to the third lower stretch 92.

In one embodiment, the reflector element 56 of the electronic board supporting the LED light source 16 has a white coloring, or a coating similar to the one of the film, or layer.

What is described above refers to a single signaling and/or lighting device 4; in reality, the device may in turn be obtained by placing a plurality of lighting and/or signaling devices side-by-side, each lit by a corresponding LED light source 16.

In other words, lighting and/or signaling modules 104 may be made comprising a plurality of lighting and/or signaling devices 4', 4", in which lighting portions 36', 36" of mutually contiguous devices 4', 4" are separated by barrier elements 100 opaque to the light rays of each light beam emitted by a corresponding LED light source 16', 16".

For example, said reflector elements 56 of the lighting and/or signaling devices also act as barrier elements 100 at lighting and/or mutually contiguous signaling devices 4', 4" placed side-by-side.

According to possible variants, the barrier elements 100 comprise a film which is opaque to light and/or separator septa which are opaque to light.

The barrier elements 100 may also be co-molded with the reflector element 56.

It is also worth noting that the shapes and sizes of the light guides 24', 24" may be varied; the number of light guides may be greater than two and the light guides 24', 24" may be arranged to form lighting portions 36', 36" having any shape and extension, such as for example shown in FIGS. 7 to 10.

Thereby, different lighting portions may be turned on, also in an increased number (well over two units), in order to create possible optical effects, or also in order to create text, logos, messages with said lighting portions which may have further functions with respect to the traditional one of lighting.

Thereby, the lighting device 4 also becomes an image forming device. To this end, the light guides 24 may be shaped and arranged so as to have lighting portions arranged according to different geometrical patterns: thereby, alphanumeric codes may be composed which comprise both numbers and letters of the alphabet.

Obviously, a suitable sequence for turning on the various lighting portions, due to separate controls of the respective LED light sources, will allow specific graphic effects, text and also various types of animations, to be obtained according to the needs of the user.

Due to the implementation of the diffusion layer 60, the final technical effect is the one of further homogenizing the light beams emitted by the lighting portions of the lighting and/or signaling device in order to obtain a lighting uniformity completely equivalent to the one which may be obtained with an OLED technology.

As may be noted from that described, the present invention allows the drawbacks presented in the known art to be overcome.

In particular, the automotive lighting and/or signaling device according to the present invention allows any predetermined light pattern provided with portions with any brightness level to be obtained, capable of absolving all the photometric specifications of the lamp but also capable of emitting light, graphic signals of any type so as to become an instrument for communicating information in addition to a light signaling and lighting instrument.

Moreover, the lighting and/or signaling device according to the present invention allows any animation to be obtained by the controlled activation according to a predetermined sequence of the lighting portions of the light guides.

Moreover, the various lighting portions have a level of homogeneity which is completely comparable with the ones which may be obtained with OLED technologies, while having decidedly decreased complexity and cost with respect to the latter technology.

Moreover, the lighting and/or signaling devices of the present invention have a highly reduced volume in depth, whereby they lend themselves to being applied both inside and outside the vehicle; moreover, the reduced thickness thereof facilitates the positioning in various positions since they do not require modifying the structure in which they are placed and they do not require particularly deep housings.

The lighting and/or signaling devices of the present invention may be both planar and curved and therefore they are suitable for being positioned in any point since they may easily be integrated in the curved lines of a body and/or dashboard without any difficulty.

Indeed, there are no geometry or pattern or shape limitations of the lighting portions which may be obtained.

The lighting patterns are further characterized in that they have significant uniformity and homogeneity of the light beam diffused outside the device.

Thus, a light pattern, i.e. any lighting surface, i.e. having any geometrical shape, may be obtained due to the present invention, while maintaining an increased energy efficiency and lighting homogeneity of the pattern itself.

The solution is simple to make, with limited costs, weights and volumes.

Those skilled in the art, in order to meet contingent and specific needs, can make several changes and variations to the above-described lighting and/or signaling devices, all contained within the scope of the invention, which is defined by the following claims.

The invention claimed is:

1. A lighting and/or signaling device, comprising:
a light guide which extends from a light inlet and diffusion wall adapted to receive and diffuse a light beam to a light outlet wall which creates a lighting portion of the lighting and/or signaling device,
at least one LED light source, adapted to emit the light beam along a main optical axis and facing a light emission portion of said light inlet and diffusion wall adapted to receive said light beam emitted by said LED light source,
wherein the inlet and diffusion wall and the light outlet wall are opposite to each other along the main optical axis,
the lighting portion comprising a middle lighting portion aligned with the LED light source and said light emission portion, and a peripheral lighting portion which surrounds said middle lighting portion,
the light guide being provided with extraction elements arranged on the light inlet and diffusion wall, said extraction elements including punctiform micro optics which diffuse the light towards the light outlet wall and/or towards the reflector element and a plurality of cylindrical optics disposed on the light outlet wall, at the middle lighting portion,
at least one reflector element that is separate from the light guide but associated with the light inlet and diffusion wall of the light guide and directly facing the respective extraction elements so as to reflect light towards the light outlet wall,
wherein a diffusion layer is arranged to cover the lighting portion on the side of the light outlet wall, and wherein said diffusion layer has a differentiated transmission factor according to the light intensity of the incident light rays on the lighting portion so as to obtain a uniform light intensity both on the middle lighting portion and on the peripheral lighting portion, and
wherein said plurality of cylindrical optics define cylindrical paths which are concentric to one another with respect to the main optical axis of the LED light source and which extract the incident light beams thereon, towards the diffusion layer.

2. The lighting and/or signaling device as set forth in claim 1, wherein said plurality of cylindrical optics on the light outlet wall are configured in relation to the extraction elements on the light inlet and diffusion wall, so as to extract light rays of equal light intensity overall on the lighting portion.

3. The lighting and/or signaling device as set forth in claim 1, wherein the diffusion layer has a smaller transmission factor at the middle lighting portion and a greater transmission factor at the peripheral lighting portion.

4. The lighting and/or signaling device as set forth in claim 1, wherein the diffusion layer comprises an opaline layer and the transmission factor variation is obtained by varying the thickness of the opaline layer with respect to a sectional plane parallel to a main optical axis of the LED light source.

5. The lighting and/or signaling device as set forth in claim 4, wherein the thickness of the opaline layer is greater at the middle lighting portion and smaller at the peripheral lighting portion.

6. The lighting and/or signaling device as set forth in claim 1, wherein the diffusion layer comprises an embossed layer and the transmission factor variation is obtained by varying the embossing density and/or thickness and/or roughness of the embossed layer with respect to a sectional plane parallel to a main optical axis of the LED light source.

7. The lighting and/or signaling device as set forth in claim 6, wherein the thickness of the embossed layer and/or the density and/or roughness of the embossing is greater at the middle lighting portion and smaller at the peripheral lighting portion.

8. The lighting and/or signaling device as set forth in claim 1, wherein the diffusion layer comprises a silkscreen printed layer and the transmission factor variation is obtained by different patterns of said silkscreen printed layer.

9. The lighting and/or signaling device as set forth in claim 1, wherein the light emission portion has a concavity towards the LED light source, and wherein the middle lighting portion has a conical portion, which is axisymmetric with respect to the main optical axis of the LED light source and having a vertex facing the light emission portion and aligned with the LED light source.

10. The lighting and/or signaling device as set forth in claim 9, wherein the diffusion layer has a planar peripheral portion and a conical middle projection, which is counter-shaped with respect to the conical portion of the light guide.

11. The lighting and/or signaling device as set forth in claim 9, wherein with respect to a sectional plane parallel to the main optical axis of the LED light source, the light inlet and diffusion wall comprises:
- a first lower stretch shaped to deflect/refract light rays forming a first angle so that they may affect the conical portion of the light outlet wall and be reflected by the latter by total internal reflection along the portion of the light guide delimited by the light inlet wall and the light outlet wall,
- a second lower stretch, contiguous to the first lower stretch that directs the light rays emitted at angles greater than the first angle and less than a second angle so that they may be reflected in reflection along a portion of the light guide delimited by the light inlet wall and the light outlet wall,
- a third lower stretch, contiguous to the second lower stretch that does not reflect rays refracted from the second lower stretch.

12. The lighting and/or signaling device as set forth in claim 11, wherein the extraction elements are arranged from a fourth lower stretch, which is contiguous to the third lower stretch.

13. The lighting and/or signaling device as set forth in claim 1, wherein the extraction elements are arranged according to a non-homogeneous pattern having a density which increases as the distance increases from the corresponding LED light source along a radial direction, contained in a plane perpendicular to the main optical axis and incident with the latter.

14. The lighting and/or signaling device as set forth in claim 1, wherein the reflector element is a white film or mirror reflecting the light from the light inlet and diffusion wall of the light guide.

15. A lighting and/or signaling module comprising a plurality of lighting and/or signaling devices as set forth in claim 1, wherein the lighting portions of mutually contiguous devices are separated by barrier elements opaque to the light rays.

16. The lighting and/or signaling module as set forth in claim 15, wherein reflector elements of the devices also act as barrier elements at contiguous lighting devices placed side-by-side.

17. The lighting and/or signaling module as set forth in claim 15, wherein the barrier elements comprise a film and/or separator septa opaque to the light.

* * * * *